United States Patent
Deao et al.

(10) Patent No.: US 6,775,793 B2
(45) Date of Patent: Aug. 10, 2004

(54) DATA EXCHANGE SYSTEM AND METHOD FOR PROCESSORS

(75) Inventors: Douglas Deao, Brookshire, TX (US); Deborah Keil, Pittsburgh, PA (US); Robert McGowan, Monroeville, PA (US); Craig McLean, Irwin, PA (US); Gary Swoboda, Sugar Land, TX (US); Leland Szewerenko, Pittsburgh, PA (US)

(73) Assignee: Texas Instruments Incorporated, Dallas, TX (US)

( * ) Notice: Subject to any disclaimer, the term of this patent is extended or adjusted under 35 U.S.C. 154(b) by 595 days.

(21) Appl. No.: 09/738,241

(22) Filed: Dec. 15, 2000

(65) Prior Publication Data

US 2001/0056555 A1 Dec. 27, 2001

Related U.S. Application Data

(60) Provisional application No. 60/171,392, filed on Dec. 21, 1999.

(51) Int. Cl.$^7$ .............................................. G06F 11/00
(52) U.S. Cl. ........................................ 714/29; 712/227
(58) Field of Search ........................... 714/29, 31, 30, 714/28, 32, 37, 10, 27; 712/227

(56) References Cited

U.S. PATENT DOCUMENTS

| | | | | |
|---|---|---|---|---|
| 5,630,052 A | * | 5/1997 | Shah | 714/38 |
| 5,911,059 A | * | 6/1999 | Profit, Jr. | 703/23 |
| 5,953,516 A | * | 9/1999 | Bonola | 703/24 |
| 6,142,682 A | * | 11/2000 | Skogby | 703/26 |
| 6,178,533 B1 | * | 1/2001 | Chang | 714/739 |
| 6,298,320 B1 | * | 10/2001 | Buckmaster et al. | 703/28 |
| 6,308,255 B1 | * | 10/2001 | Gorishek et al. | 712/209 |
| 6,442,725 B1 | * | 8/2002 | Schipke et al. | 714/741 |
| 2003/0135656 A1 | * | 7/2003 | Schneider et al. | 709/250 |

OTHER PUBLICATIONS

Microsoft Computer Dictionary, 1999, Microsoft Press, Fourth Edition, p. 139.*

* cited by examiner

*Primary Examiner*—Robert Beausoliel
*Assistant Examiner*—Christopher McCarthy
(74) *Attorney, Agent, or Firm*—W. James Brady, III; Frederick J. Telecky, Jr.

(57) ABSTRACT

A data exchange system that exchanges data between processors is provided. The system includes a host processor and a target processor. Data is exchanged by forming a data pipeline between the target processor and the host processor. The data pipeline includes a data unit on the target processor, an emulator and a device driver on the host processor. The data exchange system sends data through the data pipe line by transferring the data from a target memory on the target processor with the data unit to the emulator. The data exchange system transfers the data from the emulator to the first device driver.

7 Claims, 3 Drawing Sheets

DATA EXCHANGE SYSTEM AND METHOD FOR PROCESSORS

This application claims priority under 35 USC §119(e)(1) of provisional application No. 60/171,392, filed Dec. 12, 1999.

TECHNICAL FIELD OF THE INVENTION

The present invention relates to software and hardware data exchange systems, and, more particularly, to exchanging data between a plurality of processors.

BACKGROUND OF THE INVENTION

Digital signal processing refers to the electronic processing of signals, or any application that involves rapid numeric processing. The software development for applications on digital signal processors is an iterative process. A compiler translates source code into an assembly language source code. An assembler translates the assembly language source code files into machine language object files. Source files may contain instructions, assembly directives, and macro directives. A linker combines the object files into a single executable object module or program. As the linker creates the executable module, it performs symbolic relocation and resolves external references. The linker accepts object files created by the assembler as input. The linker also accepts archive or library members and output modules created previously. The objective of this development process is to produce an executable module that may be stored and executed on a device or processor.

Debugging tools are available to test processors and the linked, executable code. Application software development requires a level of simulation, observability and controllability of the software within the hardware system being developed. Tools for debugging software in a system context include simulators and emulators.

An emulator is a software development tool that allows software under development to be executed, controlled, and viewed in a real hardware environment. An emulator may be hardware, software or both. An emulator allows a user to perform software and hardware development, and to integrate the software and hardware with the target processor.

The most desirable form of emulator allows software development to occur in the real product hardware environment. To allow this form of emulation, the target processor provides an emulation interface that accesses its internal state. An emulation interface provides control and access to every memory location and register of the target processor, and extends the target processor architecture as an attached processor. The emulator can start or stop execution of the target processor program. When the target is stopped, the emulator has the capability to load, inspect, and modify all processor registers. Program data and program memory may be upgraded or downloaded.

In current emulators, when the target processor is running, only a subset of these operations are available. The registers of a running processor are changing too rapidly to make sporadic readouts meaningful. For this reason, a current practice is to:

1. Add additional peripherals to the product hardware to export meaningful diagnostic data.
2. Add additional signals to the product hardware that can be monitored by expensive test equipment, which are usually referred to as logic analyzers.
3. Build interim versions of the product hardware for testing, then switch to the real product and hope the software still works properly.

As more hardware functionality is combined into single-chip products, it becomes increasingly difficult to employ logic analyzer solutions, and increasingly expensive to add temporary diagnostic peripherals.

Traditional emulation provides start and stop control of a target system, and the ability for the user to inspect the stopped system. There is an increasing need to interact with and diagnose the running system. As systems become more complex, it is difficult for a human user to monitor each system, every time it is tested. Testing occurs throughout the development and manufacturing cycle. A means of automating such interactions is desired. Such capability also has value to the product in the field. It allows configuration for a particular use, diagnosis for repair, or accumulation of operating information.

SUMMARY OF THE INVENTION

From the foregoing it may be appreciated that a need has arisen for exchanging data between processors while emulating software applications. In accordance with one embodiment of the present invention, a data exchange system and method for processors are provided that substantially eliminates and reduces the disadvantages and problems associated with conventional processors and software development emulation systems.

A data exchange system that exchanges data between processors is provided in accordance with one embodiment. The system includes a host processor and a target processor. Data is exchanged by forming a data pipeline between the target processor and the host processor. The data pipeline includes a data unit on the target processor, an emulator, and a device driver on the host processor. The data exchange system sends data through the data pipeline by transferring the data from a target memory on the target processor with the data unit to the emulator. The data exchange system transfers the data from the emulator to the first device driver. The data may be accessed by a client coupled to the host computer or a server on the host computer. The data exchange system also sends data back through the data pipeline by matching a request from the target processor to data from the host computer.

The present invention in accordance with one embodiment includes Real-Time Data exchange (RTDX™). RTDX enables data to be transferred between a digital signal processor ("DSP") and a host computer without interfering with the running of the DSP software application. RTDX provides system developers real-time, continuous visibility as the DSP applications execute. Developers are able to monitor the DSP applications as they operate in the real world, and, thus, providing them with a means to monitor or analyze their DSP systems.

According to one embodiment the present invention, the traditional emulation capability is augmented with a real-time data transport mechanism. This mechanism enables emulation to be used with a running target processor to acquire information about the behavior of the real system. It also permits the injection of test controls and data to a running real-time system for purposes of system diagnosis and analysis. The augmented emulation system may perform both traditional and real-time development tasks at without increased cost compared to traditional emulators.

The present invention in accordance with one embodiment includes hardware support built around each processor system so operations may be executed within the processor system while doing analysis as the circuit runs. The present invention permits the software process to be run at full speed and real time as the emulator monitors the target processor. Further, the present invention allows the target processor assists in its own emulation. The hardware that enables enhanced emulation is embedded in the target processor, so that all of the operations of the target processors are monitored directly from the target processor itself. Thus, as processors execute an increasing amount of instructions per second and processor capabilities expand, the present invention allows the capabilities of the real-time, continuous emulation to expand along with the processor. The data rate range may be about 1 megabyte per second to about 2 megabytes per second. Alternatively, the data rate may be about 20 megabytes per second.

The present invention in accordance with one embodiment includes an enhanced emulator that allows a user to define and develop software in the environment of the target processor. The emulator reads inputs from a host PC and produces outputs to the PC as an assistant for the target processor, for the purpose of determining appropriate software and operations signals. The developer may interface additional host PC software to the emulator, to provide control and data signals to the target processor. The developer also may add software to the target processor that interacts with the emulator, for purposes of exchanging control and data information. Ultimately, when the target processors are supplied with the appropriate software resulting from the emulation operations, the target processor operates in the manner that is comparable to the rest of its system The present invention in accordance with one embodiment forms a data pipe between an application running on a DSP processor and a component object model client running on a host computer, or processor. A user may supply the DSP application and the component object model client. The data pipe consists of various software and hardware components. The data pipe is bi-directional in that data may flow to and from the DSP processor and to and from the host computer. The data pipe also is multiplexed in that data may be tagged as belonging to different virtual channels. The data pipe also is asynchronous in that data may be input into the pipe at any time. The data pipe also is low-intrusive in that data is transferred between the DSP processor and the host processor as background activity.

It is a technical advantage in accordance with one embodiment of the present invention that an enhanced emulation interface is provided that enables real-time exchange of data between a target processor and a development host, while maintaining low-cost control capabilities. It is another technical advantage in accordance with one embodiment of the present invention that a DSP-side programmable interface is provided that may be used by applications developers to exchange control and data information with a host processor via the emulation interface. It is another technical advantage in accordance with one embodiment of the present invention that an emulator is provided that may maintain high data transfer rates through the emulation interface while minimizing the space and speed overheads within the target processor. It is another technical advantage of one embodiment of the present invention that a development host-side programmable interface is provided that may be used by applications developers to exchange control and data information with a target processor via the emulation interface.

BRIEF DESCRIPTION OF THE DRAWINGS

For a more complete understanding of the present invention, and the advantages thereof, reference is now made to the following descriptions taken in connection with the accompanying drawings, in which.

DETAILED DESCRIPTION OF THE INVENTION

Figure 1:
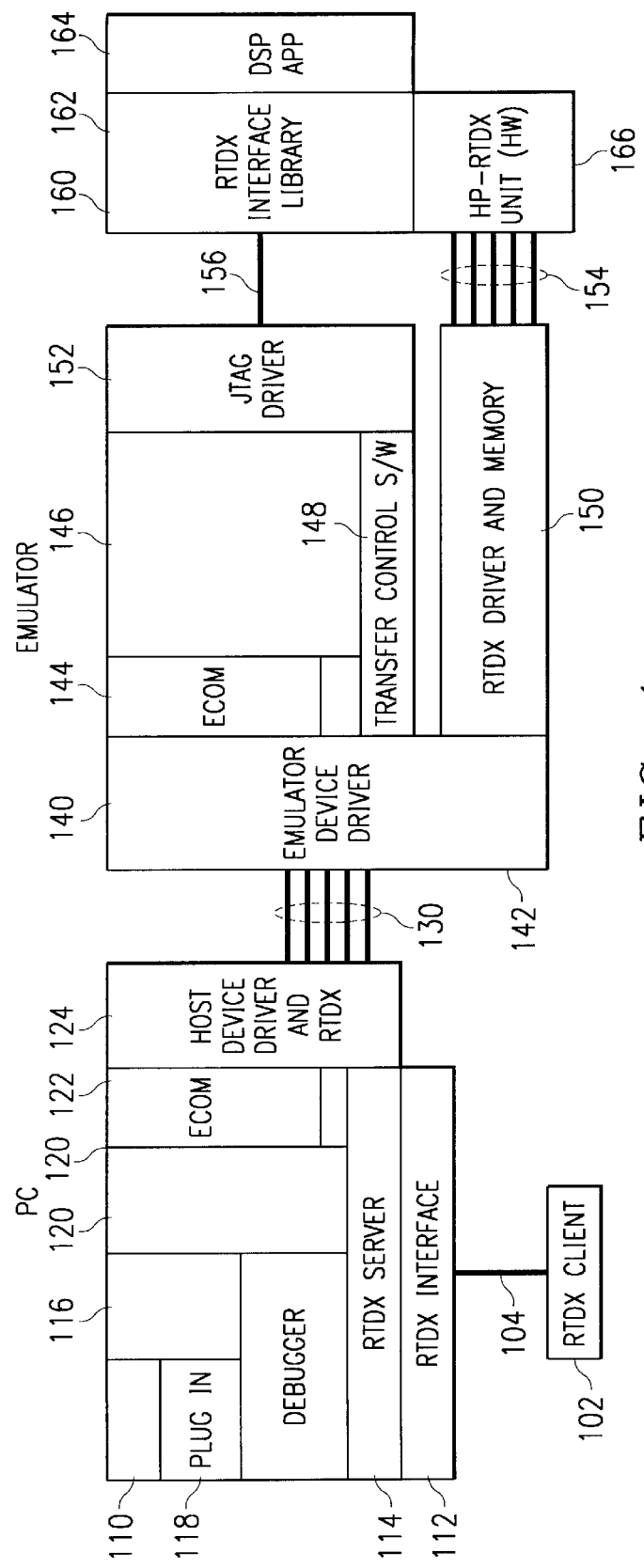
FIG. 1 illustrates a processor data exchange system in accordance with an embodiment of the present invention.
Figure 2:
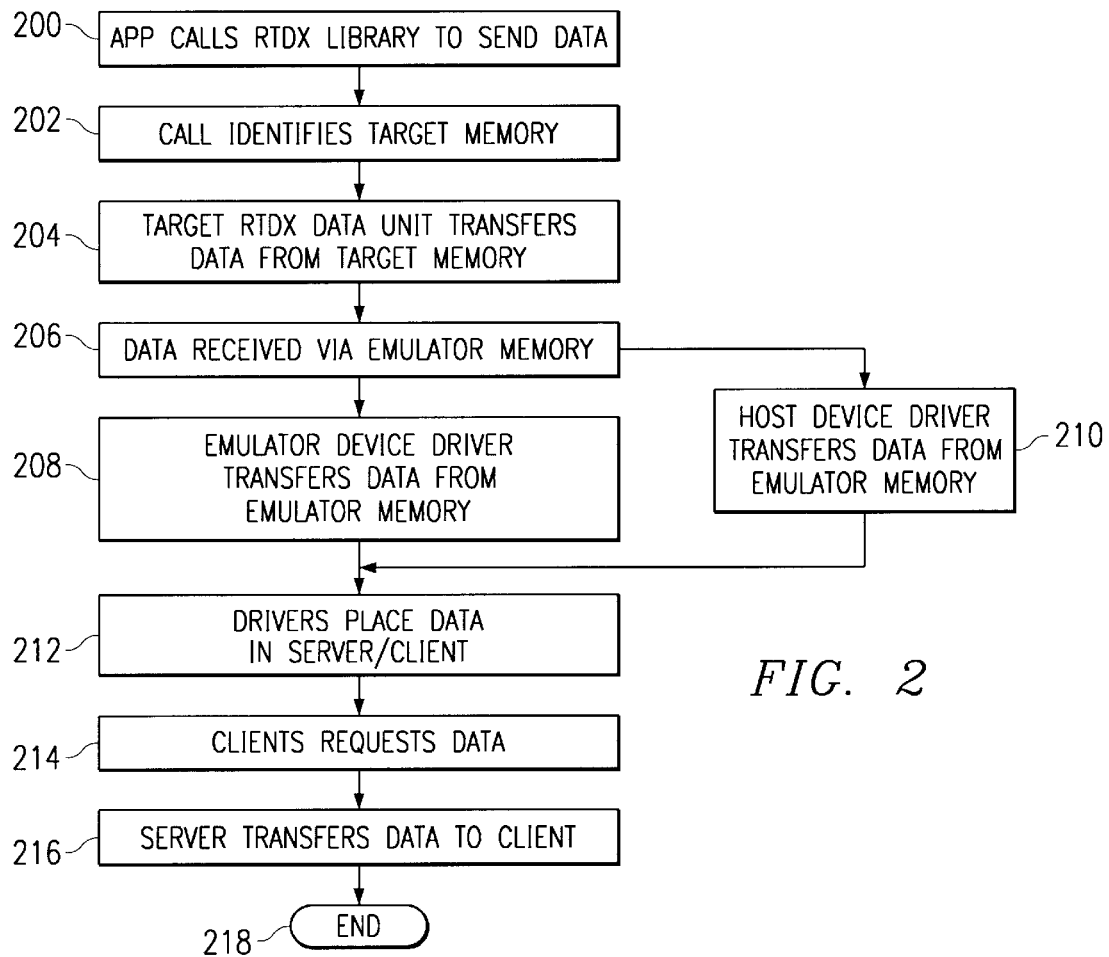
FIG. 2 illustrates a flowchart depicting a method for exchanging data between processors in accordance with an embodiment of the present invention.
Figure 3:
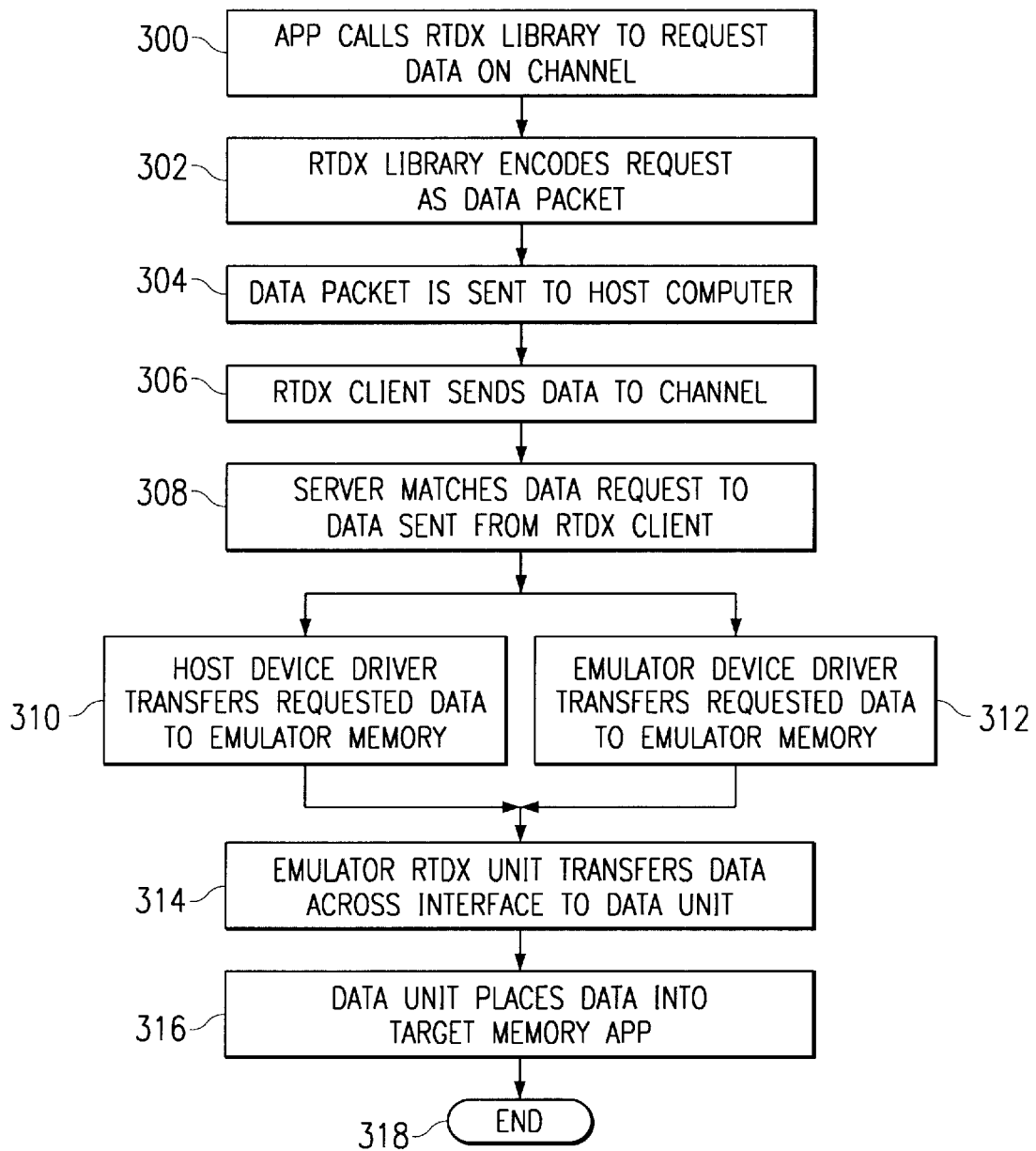
FIG. 3 illustrates a flowchart depicting another method for exchanging data between processors in accordance with an embodiment of the present invention.

An embodiment of the present invention and its advantages are best understood by referring now in more detail to FIGS. 1–3 of the drawings, in which like numerals refer to like parts. FIGS. 1–3 illustrate a data exchange system and method for processors in accordance with one embodiment of the present invention.

FIG. 1 depicts a processor data exchange system 100 that monitors the emulation of a software application on a target processor in accordance with an embodiment of the present invention. Data exchange system 100 includes an RTDX client 102, a host computer 110, an emulator 140, and a target processor 160. RTDX client 102 may be a user running applications on target processor 160 and transferring data to target processor 160. Alternatively, RTDX client 102 may have a memory. RTDX client 102 sends commands and receives information from RTDX server 114 via a development host side RTDX programming interface 112.

RTDX interface 112 is a component object model application program interface that interfaces with external RTDX clients, such as RTDX client 102. RTDX interface 112 provides various functions such as opening, enabling, disabling, reading, writing, seeking, rewinding, and closing channels. A channel is a stream of data defined by the user, the development system or target processor 160. RTDX server 114 may support multiple independent channels, which it multiplexes onto the single emulation interface. Each channel on the development host corresponds to a channel declared in DSP application 164 on target processor 160, RTDX server 114 receives and sends buffers of data from RTDX interface 112 to device driver 124 and other components on host computer 110. Device driver 124 receives and sends buffers of data via hardware interconnect 130 to device driver 142 on emulator 140. The data transport mechanism is also capable of recording for playback data received from interconnect 130. RTDX server capabilities in RTDX server 114 also are available to the emulation-enabled debugger 116, as well as to any plug-in debugger components 118.

In a preferred embodiment, there is one RTDX interface 112 per RTDX client 102. Each RTDX interface interacts with RTDX server 114 to establish channel connections with target processor 160. Each RTDX interface 102 then interacts directly with host device driver 124 to enable rapid data transmission to application 164 on target processor 160. Host device driver 124 includes an RTDX recorder/router that records the data in a log file, demultiplexes the data according to the virtual channel protocol, and then routes the data to the appropriate RTDX interface 112. Recording and routing data in host device driver 124 minimizes software overheads associated with data transport. Preferably, data may be transferred, or copied, directly to RTDX client 102 without passing through intermediary processes such as RTDX server 114. The overhead for switching processes using this method is not as substantial as known host development computers.

The emulation system provides emulation-enabled debugger 116 on host computer 110. Debugger 116 performs emulation control functions using dynamically loadable target interface modules 120 that support particular target processor 160 in use. One or more of these target interface modules may be created and uploaded, depending upon the variety of target processors in use. These modules communicate through a common embedded component module ("ECOM") 122, also included on computer 110. ECOM 122 consists of software support on computer 110 that enables target interface modules 120 to communicate with components on emulator 140. Debugger 116 enables the use of plug-in display components 118. The plug-ins are used for the visualization or control of specific application features 164. They also may use RTDX server functionality. For example, a plug-in is provided to graph the data received on a particular RTDX channel.

Using RTDX interface 112, RTDX server 114, and host device driver 124, a direct route is established from RTDX client 102 and vice versa that enables increased high speed data transmission to and from emulator 140. RTDX interface 112 runs in the process of RTDX client application 102 on the development host, thus enabling rapid client communication with DSP application 164.

Emulator 140 includes hardware and software components. Hardware components include a processor and interfaces to host interconnect 130, and emulation interconnects 154 and 156. Software components include drivers for hardware interfaces 142, 150, 152, target processor interface modules 146, target data transfer control software, or data pump, 148, and ECOM support software 144.

The hardware interconnect between emulator 140 and target processor 160 is an enhanced emulation interface containing both traditional JTAG emulation control signals transmitted on interconnect 156, as described in IEEE standard 1149.1, and configurable signals for the transmission of real-time data on interconnect 154. The use of dual-purpose interconnects 154 and 156 minimizes the number of signals being exported by target processor 160 while maintaining the control capability expected of current emulators. The ability to configure signals in this interface for real-time data exchange allows maximum data transfer rates between the emulator 140 and target processor 160, while minimizing the total number of signals required.

Emulation control functionality is supported by individual target interface software modules 146 tailored to the specific target processor 160 in use. Control functions are relayed from development target interface module 120 via the ECOM support modules 122 and 144 to emulator target interface software module 146. Preferably, a plurality of target modules 120 and 146 are uploaded. These modules control target processor 160 using the enhanced JTAG link 156 via JTAG interface driver 152. JTAG interface driver 152 and associated interface hardware provide for continuous uninterrupted transfer of data across JTAG data signals 156.

Emulator 140 may support multiple kinds of target processors 160, and combinations of different target processors at the same time. For each kind of target processor 160, a target interface software module 146 is dynamically loaded into emulator 140. ECOM modules 122 and 144 supply the dynamic loading capability. Each target interface module 120 on host computer 110 requests by name its corresponding emulator-side module 146. This capability allows support for target processors to be developed separately, and combined as required for a particular user.

Real-time data exchange is supported by data moving to or from host computer 110 via device driver 142. Device driver 142 routes data received from host computer 110 to the appropriate emulation software: ECOM 144, target data transfer control software 148, or RTDX driver/memory 150. Driver 142 transfers data coming from ECOM 144, control software 148, or RTDX driver/memory 150 to host computer 110. This data may contain results of target processor 160 software functions or the contents within registers on target processor 160. The direct routing of data on emulator 140 allows it to maintain high data rates across multiple sources and destinations by minimizing software overheads. Emulator 140 contains a substantial amount of memory used by device driver 142 to buffer the RTDX data en route between the target processor 160 and RTDX client 102. The ability to buffer large substantial amounts of data allows high data rates to be maintained on communication interconnects 130 and 154, even in the presence of slow response times typical of development host computers.

Emulator 140 supports data real-time data transfer across the data signals of JTAG interconnect 156. When used in this mode, control software 148 interacts with JTAG interface driver 152 to move data between emulator 140 and target processor 160.

Emulator 140 also is capable of configuring signals in enhanced emulation interconnect 154 for use with high-performance RTDX. In this mode, data is transferred at an increased rate by a hardware peripheral using RTDX driver/memory 150. Driver 150 for the HP-RTDX peripheral directs data received from target processor 160 directly to device driver 142. This direct connection maintains low software overhead in emulator 140 and allows it to maintain high data rates on multiple interfaces. Driver/memory 150 also directs data received from host interface 142 directly to RTDX driver/memory 150, where it is transferred with direct memory access to RTDX data unit 166. The ability to reconfigure pins for RTDX data transfer minimizes the target processor hardware connection cost.

Either the RTDX, or data pipeline, path or JTAG path enables buffers of data be transferred from RTDX client 102 via drivers 124, 142, and 152 to target processor 160.

Target processor 160 is coupled to emulator 140 via enhanced JTAG emulation interconnect 154 and RTDX interconnect 156. These interconnects contain both the signals needed for JTAG on interconnect 156 and additional signals that may be configured for higher performance data transfer on interconnect RTDX 154. Preferably, target processor 160 is an embedded processor, and, more preferably, a digital signal processor.

Application 164 communicates using RTDX via RTDX target library's programmable interface 162. The RTDX library supplies a standard interface that is independent of target processor 160 or the particular emulation interface used such as JTAG RTDX or RTDX. RTDX interface library 162 enables application 164 to declare independent streams of data called channels. Preferably, these channels are virtual channels in that are not hard wired. Each channel appears to application 162 and RTDX client 102 as an independent stream of data. The RTDX system manages the transport of this data over the shared emulation interconnects 130, 154 and 156. Application 164 may send or receive data independently on these channels. Both blocking and non-blocking functions are available to receive data. RTDX interface library 162 also supplies functions to enable, disable, and check the status of these channels. The ability to have independent data streams via a standard interface enables application software to be written in a modular form, without regard to the particular combination of modules in use at the moment. It also enables DSP application 164 using such modules to be reconfigured easily to use either JTAG or RTDX hardware on a variety of target processors.

RTDX library interface 162 interfaces to JTAG emulation interconnect 156 or RTDX emulation hardware data unit 166 to transfer data to emulator 140. In the latter case, RTDX data unit 166 is a dedicated hardware unit inside target processor 160 that supplies high-performance real-time data exchange. It provides direct memory access for data movement and a simple software interface that minimizes the size and intrusiveness of RTDX library 162. The hardware emulation support within target processor 160 enables RTDX data unit 166 to be activated, or triggered, by conditions detected within target processor 160. The desired conditions may be configured using JTAG emulation interconnect 156 via target interface modules 120 and 146.

RTDX target library 162 provides for instantaneous capture of data on target processor 160. Instantaneous capture is necessary when real-time data transfer is triggered by conditions configured by the debugger 116 via JTAG target interfaces 120 and 146. In such usage, the data to be captured may exist only at the time of the trigger detection. This specific usage requires that the data be copied instantaneously when the trigger happens. For this purpose, RTDX target library 162 copies the data into an internal buffer. The captured data is then transmitted to the host client 102 as fast as the configured emulation interconnects 154 and 156 permit.

DSP application 164 may request data from RTDX client 102 via RTDX library interface 162. Multiple requests may be pending at any given time. RTDX library 162 encapsulates such requests as a message to RTDX server 114. RTDX server 114 then responds with data from RTDX client 102 as it becomes available. This implementation moves data to DSP application 164 via the RTDX data pipeline when requested, thereby minimizing the buffer space required in the target processor 160.

Within system 100, the data pipeline is created using features and components of host computer 110, emulator 140, and target processor 160. The data pipeline includes RTDX interface 112, RTDX server 114, and device drivers 124 and 142, RTDX driver/memory 150, and RTDX data unit 166. By forming this pipeline, data may flow in real-time from a client processor, such as host computer 110, to a target processor, such target processor 160 in a bi-directional, multiplexed, asynchronous and low intrusive manner. Data and information regarding applications running on target processor 160 may be provided to RTDX client 102 in a real-time, continuous manner.

FIG. 2 depicts a flowchart of a method for sending data from target processor 160 to RTDX client 102 on a data pipeline in accordance with an embodiment of the present invention. Step 200 executes by application 164 calling RTDX library 160 to send data. Step 202 executes by RTDX library 162 identifying the target memory on target processor 160 that stores the data to be sent. The target memory may be a register on target processor 160 or cache memory storing results from executing application 164. Step 204 executes by RTDX library 162 utilizing RTDX data unit 166 to transmit data across interconnect 154 to RTDX driver/memory 150. RTDX data unit 166 copies the data within the target memory identified in step 202 to the emulation interface comprising interconnect 154 and RTDX driver/memory 150. RTDX data unit 166 takes the data directly out of the target memory as application 164 is running on target processor 160.

Step 206 executes by receiving the data into RTDX driver/memory 150 on emulator 140. RTDX driver/memory places the data into memory using direct memory access. Step 208 executes by device driver 142 transferring, or copying, the sent data. Step 210 also executes by host device driver 124 transferring, or copying, the sent data from memory on emulator 140. After the data has been transferred to device drivers 124 and 142, step 212 executes by placing the data into memory on host computer 110. The data may be placed into RTDX server 114 by device drivers 124 and 142. Preferably, the data is placed into RTDX client 102 directly.

Step 214 executes by RTDX client 102 requesting the data from RTDX server 114. Step 216 executes by RTDX server 114 transferring the data from device driver 124 to RTDX client 102. Preferably, step 216 may be bypassed and the data may be directly requested from and transferred to device driver 124. Thus, device driver 124 directly transfers data to and from RTDX client 102. Step 218 executes by completing the method of sending data from target processor 160 to host computer 110 RTDX client 102.

FIG. 3 depicts a flowchart of a method for sending data from RTDX client 102 to application 164 on target processor 160. Step 300 executes by application 164 on target processor 160 calling RTDX library 162 to request data on a particular channel created by application 164 or host computer 110. Step 302 is executed by RTDX library 162 encoding the data request in the form of a data packet to be sent through the data pipeline. Step 304 is executed by RTDX data unit transferring the data packet to RTDX server 114 on host computer 110. This data transfer is accomplished using the method described in FIG. 2. Step 306 is executed by RTDX client 102 sending the data to the same channel identified in Step 300.

Step 308 is executed by RTDX server 114 matching the data request from application 164 to the data sent from RTDX client 102. If no request is available for the data sent, the data is held until a request arrives at RTDX server 114. After the request arrives, step 310 is executed by host device driver 124 transferring, or copying, the requested data sent from RTDX client 102 to emulator memory. Preferably, the data is sent to RTDX driver/memory 150. Step 312 also is executed by device driver 142 transferring the requested data to the emulator memory or, RTDX driver/memory 150. RTDX driver/unit on emulator 140 transfers, or copies, the data across the emulation interface, including interconnect 154 to RTDX data unit 166 in step 314. Step 316 is executed by RTDX data unit 166 placing the requested data into a target memory on target processor 160 as identified by application 164. Step 318 executes by completing the method for sending data requested by application 164 on target processor 160.

Thus, it is apparent that there has been provided, in accordance with an embodiment of the present invention, a processor data exchange system and method that satisfies the advantages set forth above. Although the present invention has been described in detail, it should be understood that various changes, substitutions, and alterations may be made herein. Other examples are readily ascertainable by one skilled in the art and may be made without departing from the spirit and scope of the present invention as defined by the following claims.

What is claimed is:

1. A method for exchanging data between a remote host processor and a target processor by which debug operations are facilitated on said target processor and the operations are communicated to said host processor, said method comprising the steps of:

transferring said data from said target processor to an emulator development tool with a data unit on said target processor so that operations of the target processor are monitored directly from said target processor;

transferring said data from said emulator development tool to a device driver on said host processor; and forming a data pipeline between said target processor and said host processor with said data unit, said emulator development tool and said device driver transferring said data from said device driver to a client wherein said client transferring step includes transferring said data via a server on said host computer.

2. A method for exchanging data between a remote host processor and a target processor by which debug operations are facilitated on said target processor and the operations are communicated to said host processor, said method comprising the steps of:

opening a channel between said target processor and said host processor;

sending a request to said host processor via said channel;

matching said data to said request;

transferring said data to a device driver on said host processor;

transferring said data from said device driver to an emulator development tool; and transferring said data from said emulator development tool to said target processor with a data unit on said target processor; said matching step includes transferring said request from said device driver to a server on said host processor and receiving said data such that said server matches said data to said request.

3. The method of claim 2, wherein said receiving step includes receiving said data from a client coupled to said host processor.

4. A data exchange system for transferring data between a remote host processor and a target processor by which debug operations are facilitated on said target processor and the operations are communicated to said host processor, comprising:

an emulator development tool;

a data unit on said target processor that transfers said data from said target processor to said emulator development tool so that operations of the target processor are monitored directly from said target processor; and a device driver on said host processor that transfers data from said emulator development tool; said target processor is a digital signal processor having at least one software application embedded in said digital signal processor; said, host processor includes a server that receives a request form said target processor and matches said data from said client to said request such that said data is held outside said target processor until requested.

5. A method for exchanging data between host processor and a target processor, said method comprising the steps of:

transferring said data from said target processor to an emulator with a data unit on said target processor;

transferring said data from said emulator to a device driver on said host processor;

forming a data pipeline between said target processor and said host processor with said data unit, said emulator and said device driver and transferring said data from said device driver to a client wherein said client transferring step includes transferring said data via a server on said host computer.

6. A method for exchanging data between a host processor and a target processor, said method comprising the steps of:

opening a channel between said target processor and said host processor;

sending a request to said host processor via said channel;

matching said data to said request;

transferring said data to a device driver on said host processor;

transferring said data from said device driver to an emulator; and transferring said data from said emulator to said target processor with a data unit on said target processor; said matching step includes transferring said request from said device driver to a server on said host processor and receiving said data such that said server matches said data to said request.

7. A data exchange system for transferring data between a host processor and a target processor, comprising:

a data unit on said target processor that transfers said data from said target processor to an emulator; said target processor being a digital signal processor having at least one software application embedded in said digital signal processor and a device driver on said host processor that transfers data from said emulator; said host processor includes a server that receives a request from said target processor and matches said data from said client to said request such that said data is held outside said target processor until requested.

* * * * *